United States Patent [19]

Curtis et al.

[11] 4,113,283
[45] Sep. 12, 1978

[54] PIPE COUPLER FOR VARIOUS SIZE FLANGES

[75] Inventors: William M. Curtis; Dean E. Hermanson, both of Garland, Tex.

[73] Assignee: Youngstown Sheet and Tube Company, Youngstown, Ohio

[21] Appl. No.: 790,963

[22] Filed: Apr. 26, 1977

[51] Int. Cl.² ............................................. F16L 23/00
[52] U.S. Cl. ...................................... 285/12; 285/320; 285/364
[58] Field of Search .................... 285/320, 364, 12, 18

[56] References Cited

U.S. PATENT DOCUMENTS

| 1,910,706 | 5/1933 | Malzavd | 285/320 X |
| 3,445,127 | 5/1969 | Clarke | 285/320 X |
| 3,473,830 | 10/1969 | Haley | 285/364 X |
| 3,498,325 | 3/1970 | Ashton et al. | 285/364 X |
| 3,586,350 | 6/1971 | Ashton | 285/364 X |
| 3,661,408 | 5/1972 | Gibbons | 285/364 X |
| 3,865,409 | 2/1975 | Paddington | 285/364 X |
| 3,865,412 | 2/1975 | Ashton | 285/364 |

FOREIGN PATENT DOCUMENTS

| 1,559,425 | 1/1969 | France | 285/320 |
| 1,295,041 | 11/1972 | United Kingdom | 285/320 |

*Primary Examiner*—Thomas F. Callaghan
*Attorney, Agent, or Firm*—Vinson & Elkins

[57] ABSTRACT

The coupling disclosed is for attachment to a loading arm and permits attachment of the loading arm to flanges of different diameters by providing adapters which are releasably secured to the coupler. A different size adapter is utilized for each different size flange that the coupler is to be fastened to. The clamp arms move radially outward from the flowway through the coupler to accommodate larger size adapters which fit with larger size flanges to which the coupling is to be attached.

9 Claims, 7 Drawing Figures

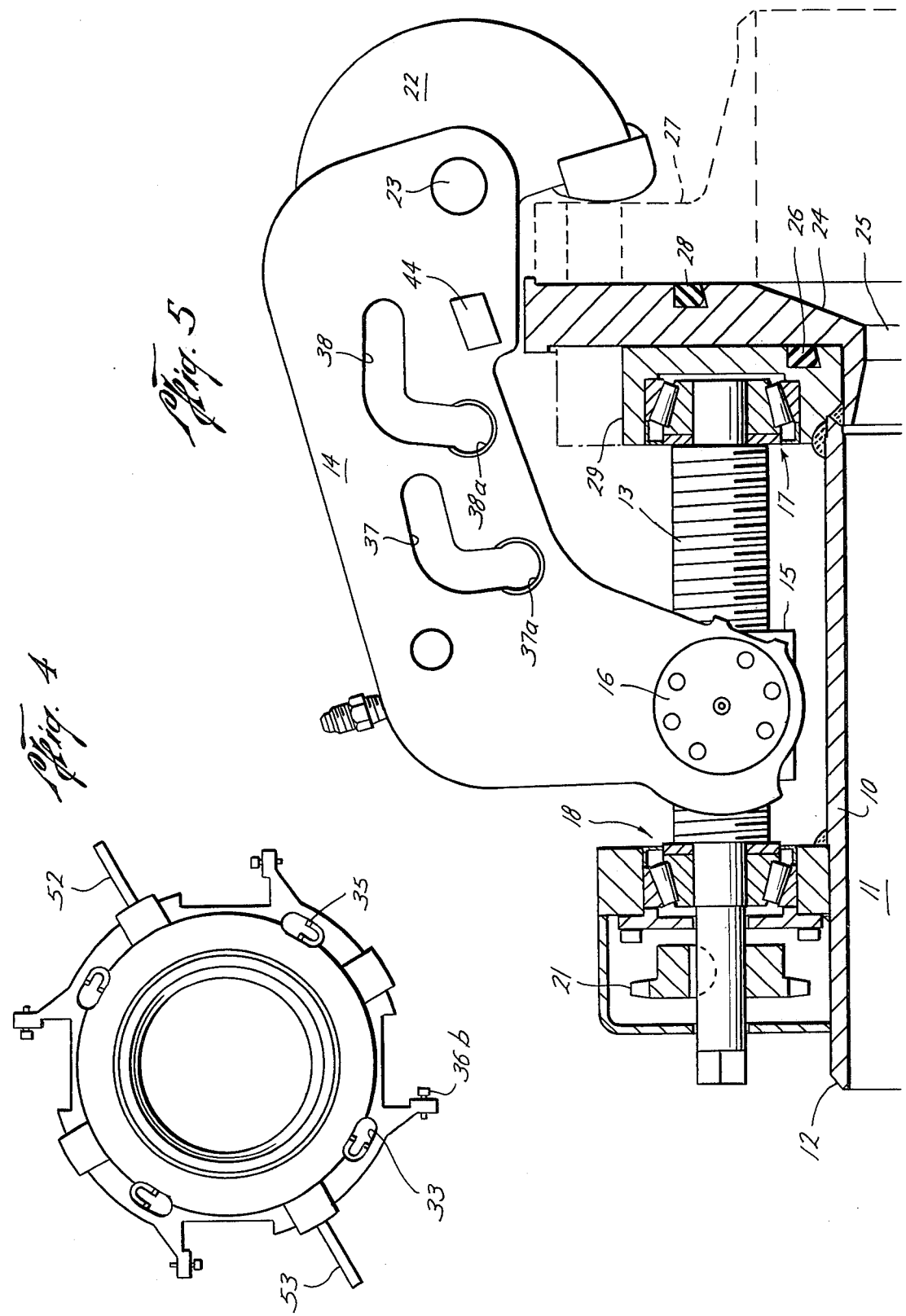

PIPE COUPLER FOR VARIOUS SIZE FLANGES

This invention relates to couplers and more particularly to couplers to be mounted on the end of a loading arm and to be attached to flanges of different sizes. U.S. Pat. Nos. 3,498,325; 3,865,412; and 3,586,350 illustrate marine loading arms and couplers associated therewith for attachment to a ship's flange. These patents and in particular U.S. Pat. No. 3,586,350 are referred to in their entirety and are incorporated herein by reference for their teaching of loading arms, couplers and adapters. Reference is also made to U.S. Pat. Nos. 924,161; 1,478,925; 1,530,651; 1,875,486; 1,910,706; 1,938,829; 2,277,990; 2,536,602; 2,634,927; 2,645,506; 2,788,993; 2,904,353; 2,919,936; 2,927,607; 2,996,318; 3,050,092; 3,056,613; 3,073,343; 3,191,969; 3,321,217; 3,332,709; 3,442,535; 3,445,127; 3,473,830; 3,489,434; 3,494,641; 3,524,662; 3,558,161; 3,615,107; 3,642,307; 3,661,408; 3,695,635; 3,702,199; 3,715,135; 3,771,819; 3,830,533; and 3,865,409. Reference is also made to Australian Pat. No. 207,296; French Pat. No. 1,475,341; and British Pat. Nos. 469,725; 854,763; and 301,066.

None of these patents teach Applicant's concept of placing the cam follower for operating the jaws on the adapter as defined in the Claims. While Malzard shows a flange threaded on the pipe supporting the cam follower there is no teaching of interchangeable adapters carrying cam followers. This permits the use of a small size coupler with its resulting light weight which reduces the amount of counterbalance necessary, particularly on the loading arm. By utilizing small size equipment, the cost of the coupler is less. None of the above patents teach the use of a plurality of cam slots on each clamp arm as defined in the claims. While a cam slot is not absolutely necessary for each size adapter, it is preferable as it gives better control of the clamp arms as the coupler is being clamped to a ship's manifold. The above patents do not teach the provision of separate means between the clamp arms and the adapters to prevent radial movement of the clamp arms as defined in the claims where clamping the coupler to a ship's manifold results in a tendency of the arms to move in a radial direction. The above patents do not teach the use of resiliently mounted cam followers to prevent the cam followers from being subjected to excessive stresses as defined in the claims. The above listed patents further do not teach a means for holding the clamp arms in a desired relationship while adapters are being interchanged as defined in the claims.

An object of this invention is to provide a means of attaching a coupler to a pipe flange where the flange sizes may be equal to, smaller, or larger than the coupler size.

Another object is to provide a coupler and adapters therefor in which the coupler can be joined to a maximum number of pipe flange sizes.

Another object is to provide a coupler which may have a relatively small size and be attachable not only to pipe flanges which are smaller than the coupler, but to several sizes of flanges which are larger than the size of the coupler to thus provide a minimum weight coupler for attachment to a wide range of pipe flanges.

Another object is to provide a coupler and a plurality of adapters for attachment to different size pipe flanges in which the clamp arms preferably travel through different paths for different size adapters so that a single clamp arm and jaw may be utilized with a plurality of flange sizes.

Another object is to provide a coupler with different size adapters in which the clamp arms are held against radial movement in those sizes in which there is a component of force tending to move the clamp arms radially outward as the coupler is attached to a pipe flange.

Another object is to resiliently mount the cam followers of a coupler to prevent them from being damaged by excessive forces.

Another object is to provide a coupler which can be utilized with different sizes of pipe flanges in which the clamp arms each have a jaw which does not have to be exchanged or changed in its position relative to the arm when the coupler is attached to different sizes of flanges.

Another object is to provide a coupler for attachment to multiple size flanges in which maximum clamping force is exerted.

Another object is to provide a coupler for attachment to various size pipe flanges in which the stresses through the clamp arms are reduced.

Other objects, features and advantages of the invention will be apparent from the drawings, the specification and the claims.

In the drawings wherein an illustrative embodiment of this invention is shown, and wherein like numerals indicate like parts;

FIG. 4 is a view in elevation of another adapter ring to be utilized with the larger sizes of pipe flanges;

FIG. 5 is a partial sectional view through a coupler and adapter of FIG. 4 with the clamp arm shown in elevation and a pipe flange to which the coupler is attached shown in dashed lines;

Figure 1:
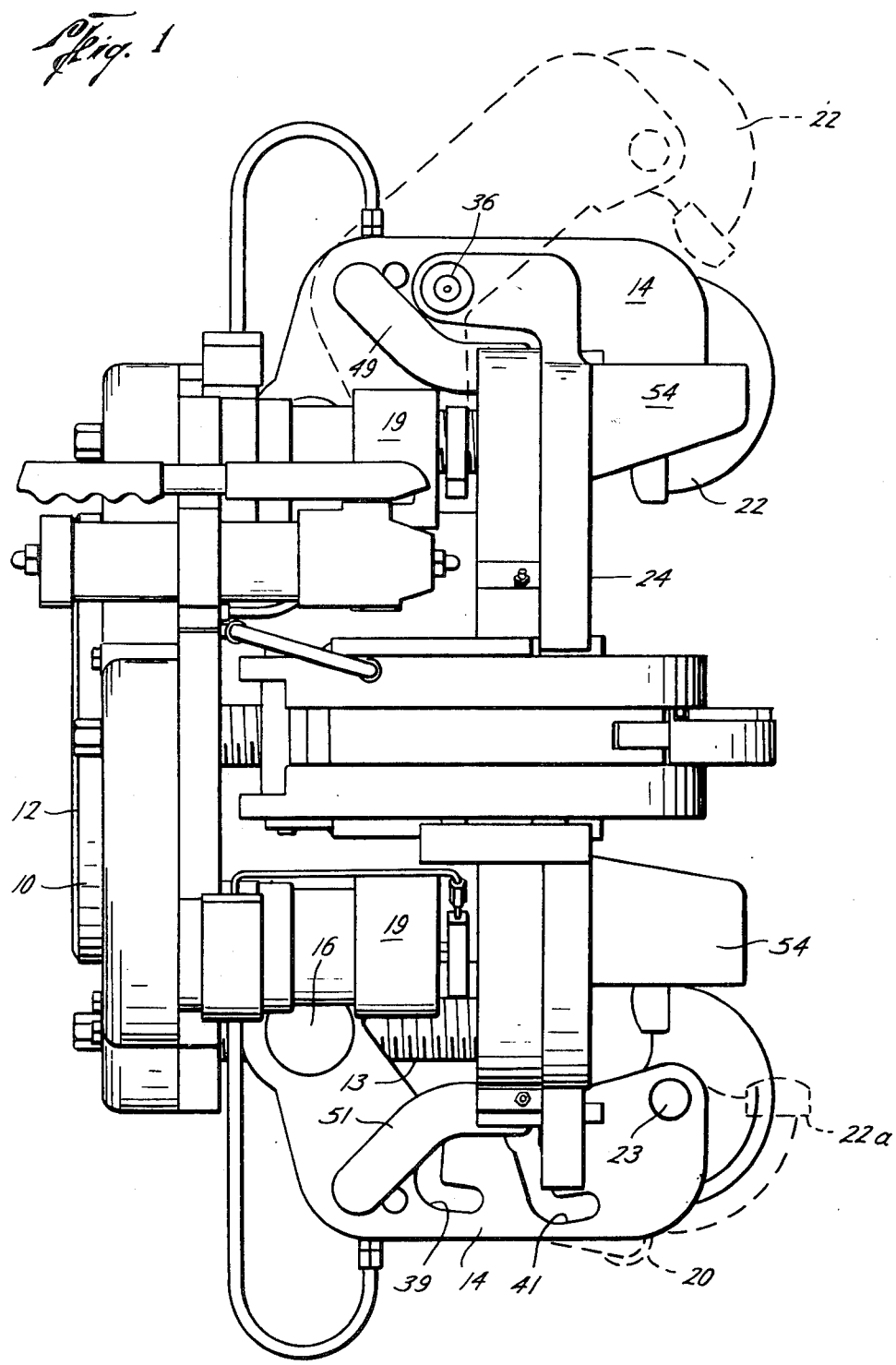
FIG. 1 is a view in elevation of a coupler constructed in accordance with this invention and showing in dashed lines the full open and emergency release positions.

The coupler includes a body 10 which may be a section of pipe having a flowway 11 therethrough. The body 10 is normally bevelled as at 12 to provide for welding the coupler to the swivel joint assembly on the free end of a marine loading arm. While the coupler may be useful in any instance where it is desired to connect to selective flanges of different sizes, the coupler finds its principal usefulness in being attached to a loading arm at a marine installation where it is desired to couple the loading arm to ships' manifolds having various sizes of pipe flanges.

A plurality of clamp arm means are provided for clamping the coupler to a flange. Each clamp arm means includes a threaded shaft 13 on which the clamp arm 14 is mounted. The mounting includes a nut 15 threaded on the shaft 13 and a trunion 16 on nut 15 providing for pivotal or swinging movement of each clamp arm 14 about the trunion 16. The threaded shaft 13 is supported in suitable bearings indicated generally at 17 and 18 which are carried by the body 10.

Power for rotating the threaded shafts 13 is provided by suitable motors 19, which drive sprockets 21 carried by the shafts 13.

The clamp arms 14 carry jaws 22 on pins 23. The jaws are preferably designed for emergency release by latch 20 as shown in dashed lines at 22a in the manner taught in U.S. Pat. No. 3,586,350.

An adapter ring 24 having a flowway 25 therethrough is mounted on the body. A different size adapter ring will be used with each different size pipe flange.

Seal means are provided between the body and adapter ring. In the preferred form an O-ring 26 is carried in the body and seals between the body and the adapter about the flowway through the body and the adapter ring.

A seal should be provided between the adapter and manifold flange 27 and preferably this seal is provided by an O-ring 28 carried in the face of the adapter ring 24 to seal between the adapter ring and the manifold flange.

Figure 7:
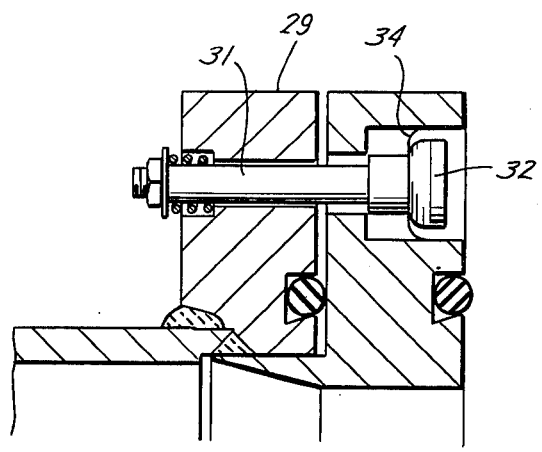
FIG. 7 is a fragmentary view partly in section and partly in elevation illustrating the manner of attachment of an adapter to the coupler body.

In order to releasably latch the adapter to the coupler body, a quick release latch structure is provided. FIG. 7 shows the body flange 29 to carry a spring loaded bolt 31 having an enlarged head 32 thereon. The adapter has an oval shaped slot 33 with a ledge 34 in one end of the slot and an inclined ramp 35 leading to the ledge. A plurality of these latch bolts and ledge and ramp structures are provided. By moving the adapter into a position in which the bolt heads 32 extend into the open portion of the oval slot 33 and then rotating the adapter, the bolt heads 32 will be forced to climb up the ramp 35 and engage the ledge 34 to releasably latch the adapter on the body.

In order to control the path of travel of the free end of the clamp arms 14, each adapter is provided with a cam follower 36 for each clamp arm 14. This cam follower cooperates with a cam slot on the clamp arm to control the travel of the free end of the clamp arm. While a single cam follower and cam slot could be used for more than one size of adapter, it is preferred that there be a single cam follower means and a single cam slot means which cooperate with each other for each size of adapter. In this way an individual path of travel is provided for the jaw with each size adapter and the jaw may be positioned as close to the shank of a manifold pipe flange as desired. It will be appreciated that as a ship moves at the dock the manifold flange is subjected to considerable stresses due to its movement. To minimize the effect of these stresses, it is preferred to have the jaws 22 as close to the center line of the manifold flange as possible. In the preferred form of this invention, each adapter is provided with a cam follower 36 which cooperates with a particular cam slot means such as slot means 37 or 38 in the clamp arm. In the preferred form four cam slots are provided on each clamp arm with slots 37 and 38 being shown in FIG. 5 and slots 39 and 41 being shown in FIG. 1. From a comparison of FIG. 1 and the clamp arm as shown in FIG. 5 it will be apparent that cam follower 36 is operative in slot 37. A different size of adapter would position a similar follower for operation in cam slot 38.

When the point of contact of the jaw 22 with a manifold flange is inboard of the center line of the threaded shaft 13 there is a tendency for the clamp arm to move radially outward as clamping force is applied. In order to prevent this from happening, the adapter is provided with slot means 42 and 43 with which a pair of key means, one of which is shown at 44 on the clamp arm, cooperates. Preferably, the slots and keys are dimensioned so that if the clamp arm moves in the path determined by the cam follower and cam slot, the keys do not engage the adapter. If, however, the arms tend to move outwardly, the keys come into engagement and would prevent any substantial outward movement.

Figure 2:
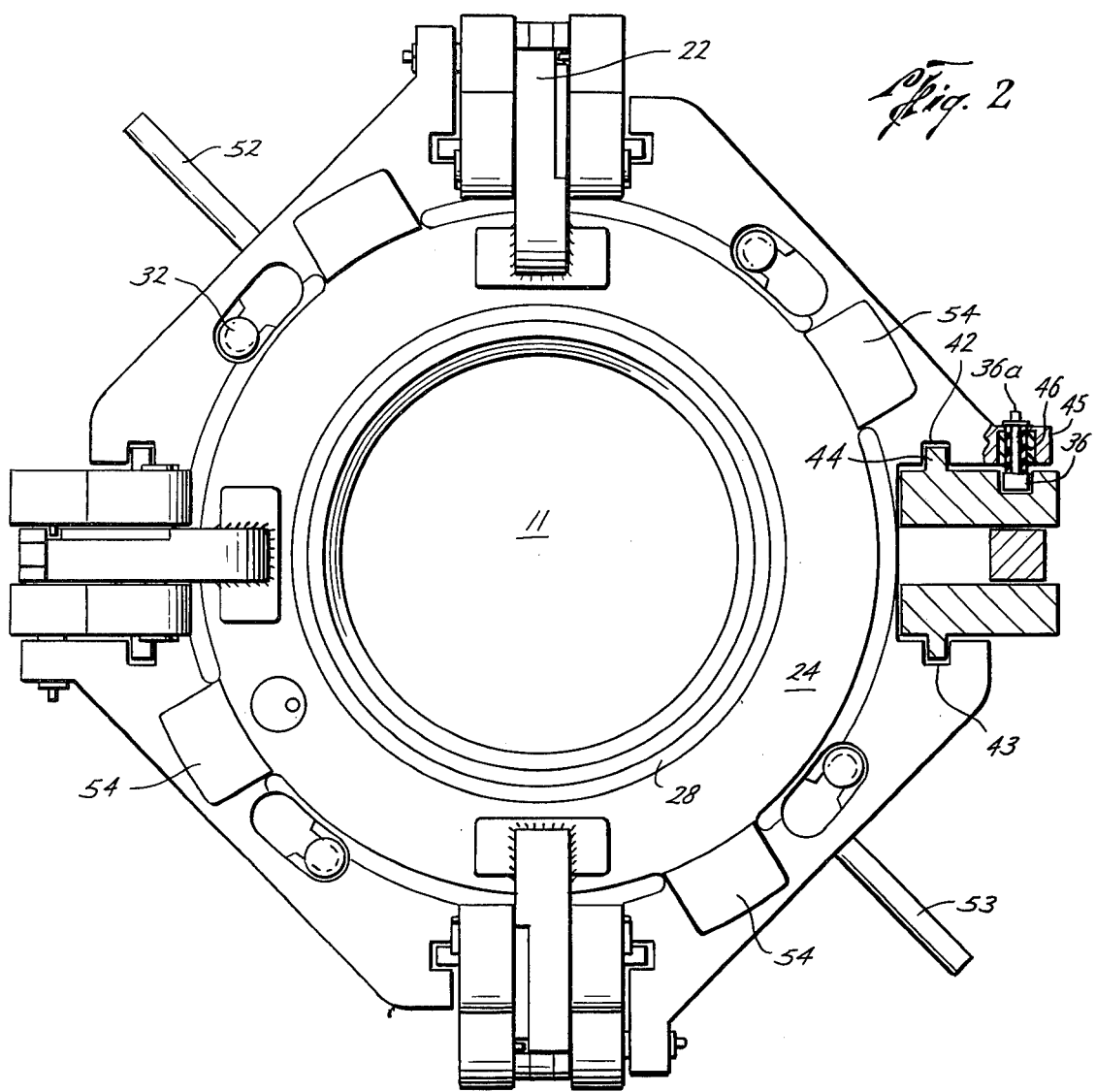
FIG. 2 is a view in elevation of the coupler of FIG. 1 looking at the free end of the coupler with parts shown in section.
Figure 3:
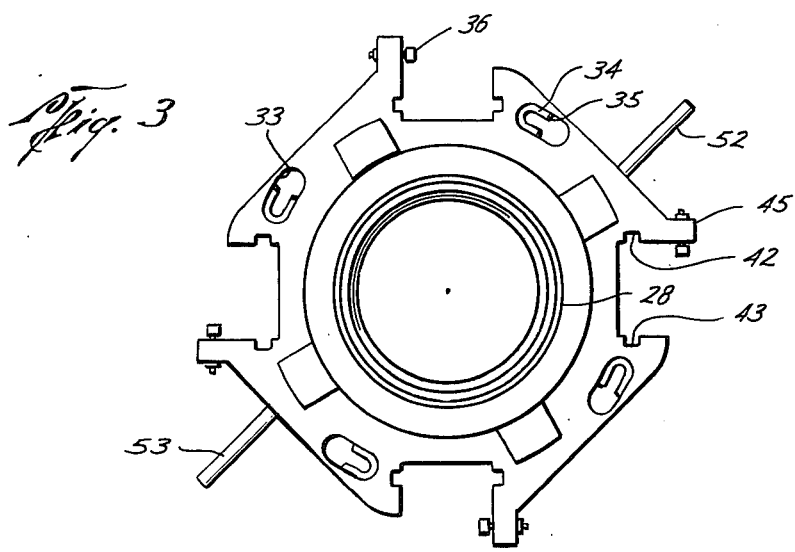
FIG. 3 is a view in elevation of the adapter ring of FIGS. 1 and 2.

In order to prevent the imposition of high stress on the cam follower, it is preferably provided with a resilient mounting so that it may yield if the jaw moves outwardly but yet will serve the function of providing stability for properly positioning the clamp arm prior to reaching the fully clamped position. By reference to FIG. 2 it will be noted that the cam follower 36 is carried by a boss 45 on the adapter and that a resilient mounting for the follower 36 is provided by the sleeve of resilient material 46 between the cam follower shaft 36a and the boss 45.

FIG. 4 illustrates a modified form of adapter in that the cam follower 36b which is identical to cam follower 36 is mounted on the other side of the clamp arm and the relationship of the oval groove 33, ramp 35 and ledge 34 is reversed so that rotation of the adapter in a counterclockwise direction will attach the adapter and will engage the cam follower in the cam slot. It is noted that in this form of adapter the slots 42 and 43 are not present. This is because the adapter size is such that the jaw 22 when fully engaged lies outboard of the center line of the threaded shaft 13 and there is no component of force tending to move the jaw radially outward.

There are several jaws spaced about the coupler and it is preferred that these jaws be held in a fixed relationship while adapters are being changed. For this purpose each clamp arm is provided with ears 47 and 48 adjacent the trunion 16 (see FIG. 6). When the trunion nut 15 is run to the full open position, these ears 47 and 48 engage the bearing 17 supporting the threaded shaft and lock the clamp arm in the full open position. At this time the cam followers reside in the most inboard portion of each cam slot such as the circular end 37a and 38a of the cam slots shown in FIG. 5. These enlarged circular portions are larger than the cam followers to permit ease of movement of the cam followers into the slots.

In operation the coupler would be attached as by welding the bevelled surface 12 of the body to a swivel fitting of a loading arm. The threaded shafts 13 would be rotated by motors 19 to engage the ears 47 and 48 with the bearing 17. This would fix each of the arms in the fully open position. The arms themselves would be held against rotation by the guides 49 and 51 (FIG. 1). An adapter of the appropriate size to be used with the manifold flange to which the coupler is to be attached would be selected and would be moved into position over the latch bolts 31. The adapter would then be rotated to force the studs to climb the ramps 35 and rest on ledges 34 to latch the adapter to the coupler body. At the same time the rotational movement would move the cam follower into the appropriate cam slot on each clamp arm. Handles 52 and 53 are provided for use in positioning the adapter on the coupler body. At this time the two seals 26 and 28 would be in position for sealing between the body and adapter and between the adapter and the manifold flange to which the coupler is to be attached. The coupler would then be moved into position to engage the manifold flange. At this time the guide lugs 54 would engage the manifold flange 27 to center the coupler relative to the manifold flange in the position shown in FIG. 5. Thereafter rotation of the shafts 13 to move the trunion nut 15 toward bearing 18 would bring the jaws radially inward and move them into engagement with the manifold flange 27 to complete the connection between the loading arm and manifold flange. If in the final make up of the clamp arms there is a tendency for the clamp arms to move radially outward the keys 44 would engage in the slots 42 and 43 and limit this movement.

Figure 6:
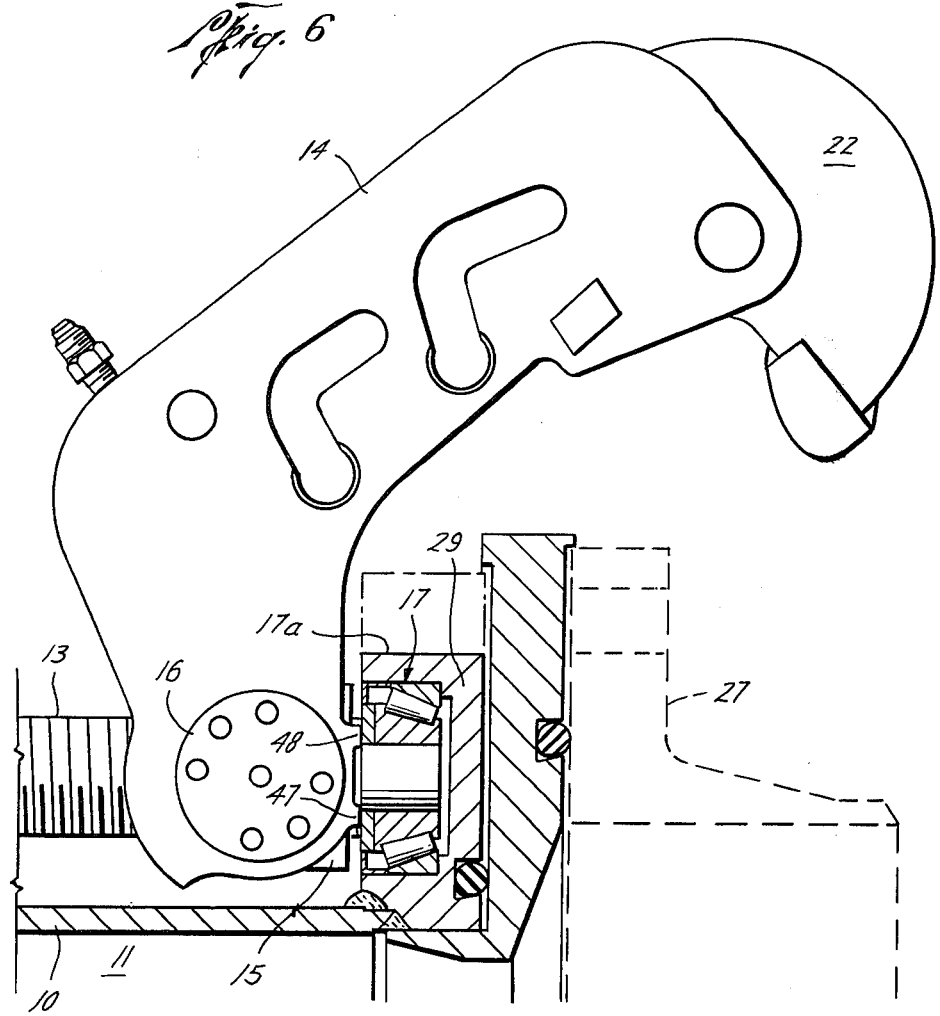
FIG. 6 is a view similar to FIG. 5 showing a clamp arm being held in open position in the relationship it would occupy during changing of an adaptor.

From FIG. 6 it is apparent that the body does not obstruct outward swinging movement of the clamp arms 14. The slot 17a in body flange 29 is dimensioned to permit the clamp arm 14 to move inwardly to the bottom of the slot for a maximum inward reach. Thus a small body may be utilized for a maximum number of flange sizes and the only limitation is the maximum angle at which the clamp arm can be effective. Of course the adapters will always have their outer periphery sized to prevent interference with operation of the clamp arm.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A coupler comprising,
   a body having a flowway therethrough,
   a plurality of clamp arms each having cam slot means therein,
   pivot means mounting each arm on the body for swinging movement about the pivot,
   means for moving said pivot means along the body,
   an adapter ring having a flowway therethrough,
   means releasably mounting said adapter ring on the body,
   means sealing between the body and adapter ring about the flowways therethrough,
   and cam follower means on the adapter ring cooperating with the cam slot means in each clamp arm controlling movement of the clamp arm during movement of the pivot means along the body.

2. The coupler of claim 1 wherein
   key means are provided on each clamp arm,
   and said adapter ring has slots engaging and disengaging said key means as said pivot means is moved along said body to control movement of the clamp arm in a direction normal to said adapter ring flowway when the key means and slots are engaged.

3. The coupler of claim 1 wherein the cam followers are resiliently mounted on the adapter ring.

4. The coupler of claim 1 wherein
   key means are provided on each clamp arm,
   and said adapter ring has slots engaging and disengaging said key means as said pivot means is moved along said body to control movement of the clamp arm in a direction normal to said adapter ring flowway when the key means and slots are engaged and the cam followers are resiliently mounted on the adapter ring.

5. The coupler of claim 1 wherein
   each clamp arm has a plurality of cam slots,
   and wherein a plurality of adapter rings are interchangeably mountable on the body with each size adapter ring having cam followers cooperable with different sets of cam slots in the clamp arms.

6. The coupler of claim 1 wherein
   means are provided on the body and clamp arms retaining the clamp arms in open position when the pivot means is moved to clamp arm open position to retain the clamp arms in position during replacement of an adapter ring.

7. The coupler of claim 1 wherein the cam followers automatically engage the cam slots when the adapter ring is latched to the body.

8. A coupling system for a loading arm comprising,
   a body having a flowway therethrough attachable to a loading arm,
   a plurality of different size adapter rings each having a flowway therethrough and releasably attachable to said body and providing for attachment of said loading arm to different size pipe flanges,
   means sealing between said body and adapter rings about the flowway therethrough,
   said adapter rings having cam followers thereon,
   clamp arms carried by said body and controlled in their movement between open and closed positions by said cam followers,
   and means for moving said clamp arms between open and closed position.

9. A coupling system for a loading arm comprising,
   a body having a flowway therethrough attachable to a loading arm,
   a plurality of different size adapter rings each having a flowway therethrough and releasably attachable to said body and providing for attachment of said loading arm to different size pipe flanges,
   means sealing between said body and adapter rings about the flowway therethrough,
   said adapter rings having cam followers thereon;
   clamp arms carried by said body and controlled in their movement between open and closed positions by said cam followers,
   means for moving said clamp arms between open and closed position,
   and each clamp arm having a plurality of cam slots for receiving said cam followers and causing said clamp arm to travel in different paths when moving between open and closed position.

* * * * *